US008144847B2

(12) United States Patent
Daly (10) Patent No.: US 8,144,847 B2
(45) Date of Patent: Mar. 27, 2012

(54) TELEPHONE NUMBER ASSIGNMENT METHOD

(76) Inventor: Eugene Daly, Alamo, CA (US)

( * ) Notice: Subject to any disclaimer, the term of this patent is extended or adjusted under 35 U.S.C. 154(b) by 824 days.

(21) Appl. No.: 12/031,196

(22) Filed: Feb. 14, 2008

(65) Prior Publication Data

US 2008/0198987 A1 Aug. 21, 2008

Related U.S. Application Data

(60) Provisional application No. 60/890,743, filed on Feb. 20, 2007.

(51) Int. Cl.
*H04M 15/00* (2006.01)
*H04M 3/42* (2006.01)

(52) U.S. Cl. .......... 379/114.05; 379/114.13; 379/201.01

(58) Field of Classification Search ............. 379/114.05, 379/114.13, 142.02, 142.07, 142.09, 201.01, 379/201.11, 210.02, 210.03, 211.04, 214.01; 705/53

See application file for complete search history.

(56) References Cited

U.S. PATENT DOCUMENTS 6,327,353 B1 * 12/2001 Fukuzawa et al. ....... 379/201.01
7,013,132 B2 * 3/2006 Kehr ............................. 455/415
7,027,575 B1 * 4/2006 Burgess ................... 379/201.01
7,555,525 B2 * 6/2009 Malik ........................... 709/206
7,602,894 B1 * 10/2009 Shaffer et al. ............ 379/210.02
2005/0028188 A1 * 2/2005 Latona et al. ................... 725/13
2005/0074102 A1 * 4/2005 Altberg et al. ............. 379/114.1
2006/0177029 A1 * 8/2006 Dotan et al. ............. 379/114.01
2008/0045186 A1 * 2/2008 Black et al. ................... 455/413
2008/0084982 A1 4/2008 Chatterjee
2008/0212759 A1 9/2008 Bates

* cited by examiner

*Primary Examiner* — Quoc D Tran
(74) *Attorney, Agent, or Firm* — Brake Hughes Bellermann LLP (57) ABSTRACT

Various example embodiments are described. According to one example, a method may include maintaining a database of a plurality of direct inward dial telephone numbers, including a subset of the direct inward dial telephone numbers which are available for assignment; receiving, through a website, an application from a customer for an alias telephone number to be associated with a customer telephone number; processing the application, the processing including assigning to the customer an alias telephone number selected from the subset of available telephone numbers which are available for assignment and associating the alias number with the customer telephone number; and receiving a telephone call from a third party to the alias telephone number and routing the telephone call from the alias telephone number to the customer telephone number.

23 Claims, 4 Drawing Sheets

TELEPHONE NUMBER ASSIGNMENT METHOD

PRIORITY CLAIM

This application claims the benefit of priority based on U.S. Provisional Application No. 60/890,743, filed on Feb. 20, 2007, entitled, "Telephone Number Assignment Method," the disclosure of which is hereby incorporated by reference.

TECHNICAL FIELD

This description relates to assigning telephone numbers.

BACKGROUND

Persons providing contact information to others may not wish to give their true telephone number. For example, persons who meet others through dating websites may desire to allow temporary contact which may be revoked at a later time. In another example, businesses may desire to give potential customers a telephone number which is local to the prospective customers when the business is actually located in a different geographical area.

SUMMARY

According to one general aspect, a method may include maintaining a database of a plurality of direct inward dial telephone numbers, including a subset of the direct inward dial telephone numbers which are available for assignment; receiving, through a website, an application from a customer for an alias telephone number to be associated with a customer telephone number; processing the application, the processing including assigning to the customer an alias telephone number selected from the subset of available telephone numbers which are available for assignment and associating the alias number with the customer telephone number; and receiving a telephone call from a third party to the alias telephone number and routing the telephone call from the alias telephone number to the customer telephone number.

According to another general aspect, a method may include maintaining a database of a plurality of telephone numbers, including a subset of the direct inward dial telephone numbers which are available for assignment; receiving, via a website, an application from a customer to purchase use of an alias telephone number, the application including a customer telephone number, a geographical area, and a customer number to be associated with the alias number; processing the application to purchase use of the alias telephone number, the processing including: selecting the alias telephone number from the subset of direct inward dial telephone numbers available for assignment based on the geographical area, and assigning the alias telephone number to the customer and associating the alias number with the customer number; and receiving a telephone call from a third party to the alias telephone number and routing the telephone call from the alias telephone number to the customer telephone number.

According to another general aspect, an apparatus may be configured to maintain a database of the plurality of telephone numbers, including a subset of the direct inward dial telephone numbers which are available for assignment; receive, through a website, an application from a customer for an alias telephone number, the application including a customer telephone number; process the application, the processing including assigning to the customer the alias telephone number selected from the subset of available telephone numbers which were ready for assignment; and receive a telephone call from an unknown third party to the alias telephone number and route the telephone call from the alias telephone number to the customer telephone number.

According to another general aspect, a method may include maintaining a database of a plurality of telephone numbers, including a subset of the direct inward dial telephone numbers which are available for assignment; receiving an application from a customer for an alias telephone number to be associated with a customer telephone number; processing the application, the processing including assigning to the customer an alias telephone number selected from the subset of available direct inward dial telephone numbers which are available for assignment and associating the alias number with the customer telephone number; and receiving a telephone call from a third party to the alias telephone number through a public switched telephone network and routing the telephone call from the alias telephone number to the customer telephone number.

DETAILED DESCRIPTION

Figure 1:
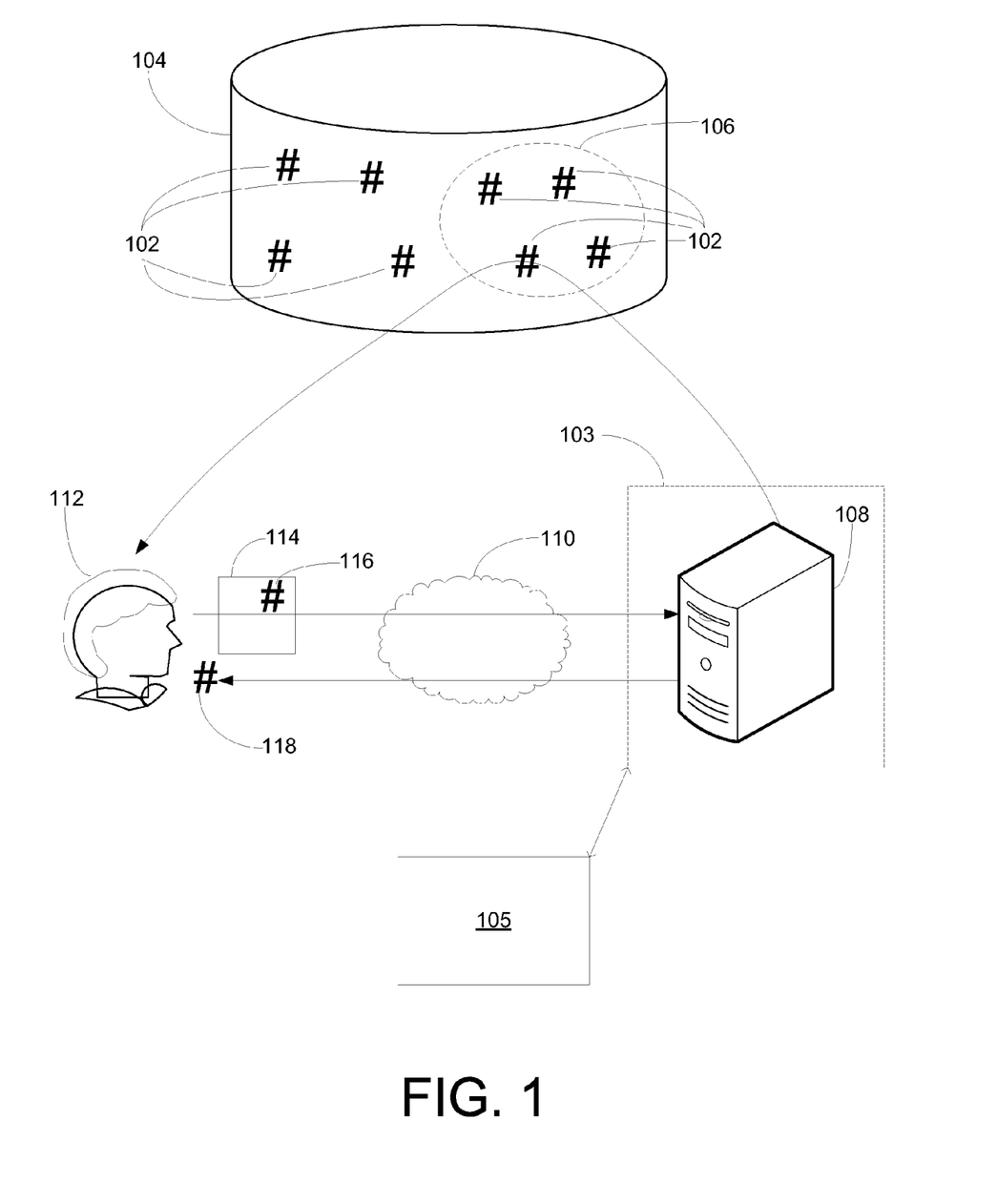
FIG. 1 is a diagram of a system for assigning an alias telephone number to a customer, according to an example embodiment.

FIG. 1 is a diagram of a system for assigning an alias telephone number to a customer, according to an example embodiment. In an example embodiment, a plurality of direct inward dial telephone numbers 102 may be maintained. A service provider 103 may maintain the ability to use these direct inward dial telephone numbers 102 as needed. The service provider 103 may receive telephone calls which were placed to any of the direct inward dial telephone numbers 102, and may recognize which telephone number 102 was the intended recipient of the telephone call.

The service provider 103 may maintain the ability to use the direct inward dial telephone numbers 102 by purchasing the direct inward dial telephone numbers 102 from a local exchange carrier 105, such as an Incumbent Local Exchange Carrier (ILEC) or a Competitive Local Exchange Carrier (CLEC), for example, or may provide the direct inward dial telephone numbers 102 by software or may provide the ability to dial a user by name. In one example embodiment, the service provider 103 may maintain an interconnection agreement with an ILEC. Examples of ILECs in the United States with which the service provider 103 may maintain an interconnection agreement may include Verizon, SBC, Bell South, or Qwest. These are merely examples. For example, the service provider 103 may pay telephone service fees to the ILEC in exchange for the ability to receive telephone calls made to the direct inward dial telephone numbers 102.

In another example, the service provider 103 may purchase the direct inward dial telephone numbers 102 from a CLEC. Examples of CLECs from which the service provider 103 may purchase the direct inward dial telephone numbers 102 include ZTel, PacWest Telecom, US LEC, and Icon Telecom. In yet another example, the service provider 103 may pay the telephone service fees to a cellular telephone service provider 103, such as, for example, Sprint, Cingular, or Verizon, in exchange for the ability to receive telephone calls made to the direct inward dial telephone numbers 102.

The direct inward dial telephone numbers 102 may be maintained by a database 104. The database 104 may, for example, sort the direct inward dial telephone numbers 102 according to availability for assignment. In this example, the database 102 may include a subset 106 of the direct inward dial telephone numbers 102 which are available for assignment. The database 104 and the subset 106 may, for example, be maintained by a server 108. In this example, the server 108 may maintain the database 104 of the plurality of direct inward dial telephone numbers 102, including the subset 106 of direct inward dial telephone numbers 102 which are available for assignment.

In an example embodiment, a website 110 may be maintained. The website 110 may be maintained, for example, by the server 108. In an example embodiment, the website 110 may be configured to allow a customer 112 to purchase use of one of the direct inward dial telephone numbers 102. The use may be purchased for a specified period of time, such as one month, or three months, as examples. The website 110 and/or server 108 may be configured to assign the telephone number 102 to the customer 112 "on the fly," such as during a single session while the customer 112 is logged onto the website 110. The database may also be maintained by the user or by the administrator. In an example embodiment, the customer may purchase use of the telephone number 102, and the server 108 may assign the telephone number 102 to the customer 112, both during a persistent connection between the server 108 and an internet service provider (not shown) of the customer 112.

In an example embodiment, the customer 112 may send an application 114 to the server 108 via the website 110. The website 110 is but one example of an interface with the customer 112. Another example embodiment may utilize a call center (not shown). In this example, the customer 112 may place a telephone call to the call center, which may be maintained by the service provider 103. The customer 112 may provide the application 114 to the service provider 103 by orally providing information to a call service employee of the service provider 103 during the telephone call, and the service provider 103 may receive the application 114 by receiving the 103 information during the telephone call through the call service employee of the service provider. The service provider 103 may assign the telephone number 102 to the customer 112 by the call service employee of the service provider 103 orally informing the customer 112 of the telephone number 102 during the telephone call. In other examples, the service provider 103 may assign the telephone number 102 to the customer 112 by sending an electronic message or email to the customer 112, or by having the call service employee give the customer a telephone number to call and receive the telephone number 102.

In another example, the customer 112 may sending the service provider 103 an electronic message or email which includes the application 114, which may be received by the service provider 103. The service provider 103 may assign the telephone number 102 to the customer 112 by sending the customer an electronic message or email which includes the telephone number.

In this example, the server 108 may receive the application 114 via or through the website 110. The application 114 may include a customer telephone number 116. The customer telephone number 116 may include a standard ten-digit telephone number, including an area code. The customer telephone number 116 may include any telephone number at which the customer 112 may receive any telephone call. The customer telephone number 116 may be stored in the database 104, in an example embodiment.

The application 114 may also include payment information or financial information, such as credit card information; in this example, receiving the application 114 (such as by the server 108) may include receiving payment information or financial information such as credit card information. In an example embodiment in which the customer 112 desires to show a local presence, the application 114 may also include geographical information, such as a city or state or area code.

The application 114 may be processed, such as by the server 108, according to an example embodiment. Processing the application 114 may include selecting a direct inward dial telephone number 102 from the subset 106 of available direct inward dial telephone numbers 102 and assigning the selected telephone number 102 to the customer 112 as an alias telephone number 118. The alias telephone number 118 may include a ten-digit number, including an area code, for example. The alias telephone number 118 may be selected from the subset 106 of available telephone numbers 102 by random assignment, according to an example embodiment.

In an example embodiment, the server 108 may process the application 114 by, for example, assigning to the customer 112 the alias telephone number 118 selected from the subset 106 of available direct inward dial telephone numbers 102 which are ready for assignment. In another example embodiment, the server 108 may confirm the availability of a direct inward dial telephone number 102 corresponding to the geographical information in the application 114, and assign the customer 112 an alias telephone number 118 corresponding to the geographical information.

The server 108 may also receive the payment or financial information such as credit card information, and may process the application 114 by processing the payment or financial information such as credit card information. The server 108 may process the payment or financial information such as credit card information by confirming the payment or financial information such as credit card information with a third party vendor (not shown). In an example embodiment, the server 108 may simultaneously confirm availability of the alias telephone number 118, such as an alias telephone number 118 corresponding to a geographical area, and confirm the payment or financial information such as credit card information with the third party vendor.

The alias telephone number 118 may be assigned to the customer 112 by, for example, sending an electronic message or email to the customer 112. The electronic message or email may include the alias telephone number 118. In another example embodiment, the alias telephone number 118 may be displayed to the customer 112 on the website 110. This processing of the application 114 may be performed without human intervention, for example.

In an example embodiment, the server 108 may receive the application 114 and process the application 114 during a single session in which the customer 112 is logged onto the website 110, or during a persistent connection between the server 108 and an internet service provider of the customer 112. This may allow the customer 112 to receive the alias telephone number 118 quickly while logged onto the website 110.

Figure 2:
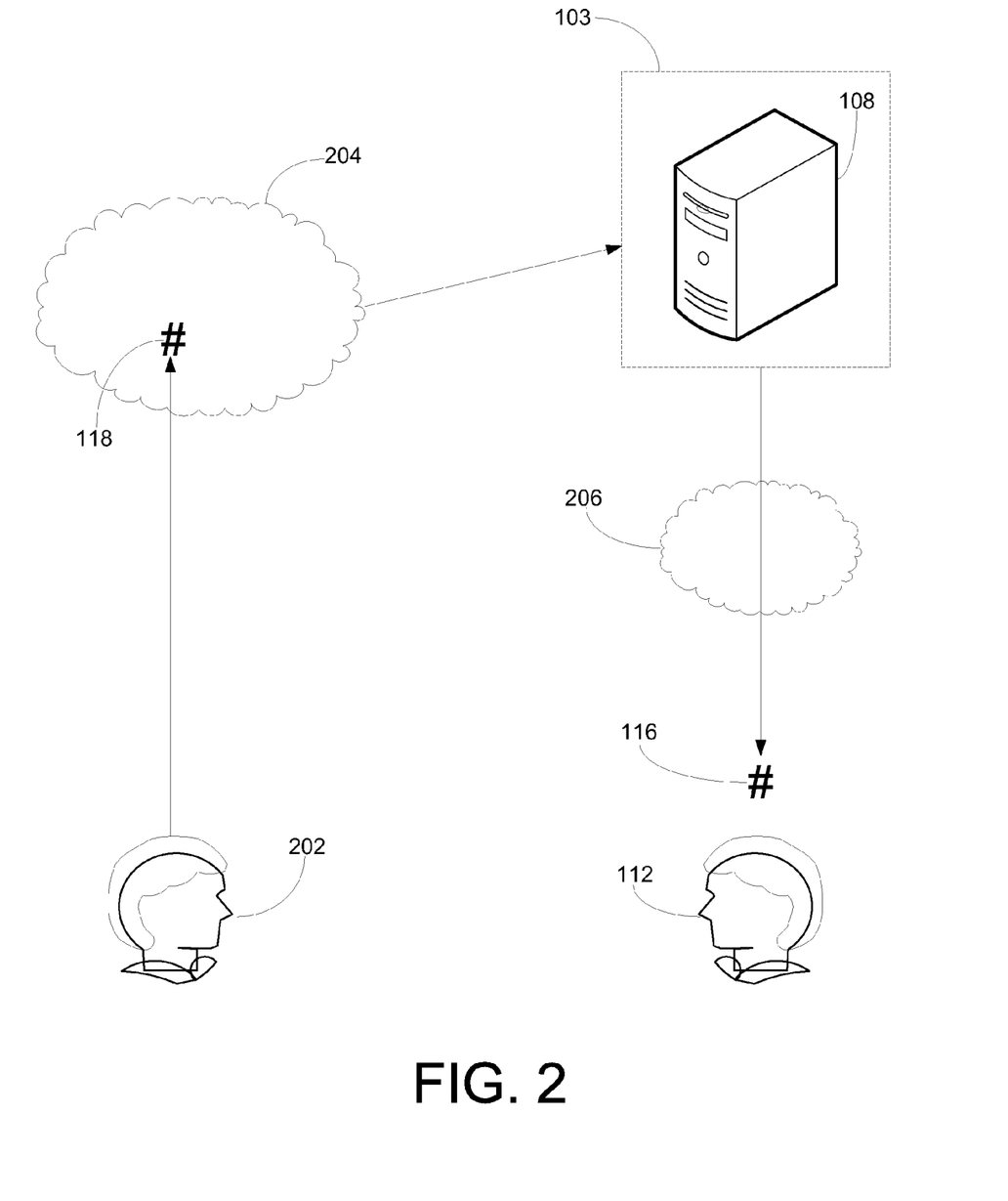
FIG. 2 is a diagram showing routing voice data transmissions from the alias telephone number to a customer telephone number, according to an example embodiment.

FIG. 2 is a diagram showing routing voice data transmissions from the alias telephone number 118 to a customer telephone number 116, according to an example embodiment. The voice data transmissions may include, for example, telephone calls or calls to headset-equipped computers which are routed according to ten-digit numbers with area codes, such as, for example, 301-555-1212. In an example embodiment, the customer 112 may provide the alias telephone number 118 to an unknown third party 202, so that the customer 112 and the unknown third party 202 may communicate by telephone (where a telephone can be, for example, any computing device that includes voice transmission and reception capability, including a landline telephone, a wireless telephone, a cellular telephone, a computer equipped with voice transmission/reception capability, etc.) using the telephone number 118. The "unknown third party" 202 may be a person who has not established a relationship with the server 108 or any entity related to the server 108, and who may not be recognized in any database accessible by the server 108 or the service provider 103. Thus, the customer 112 may provide the alias telephone number 118 to anyone, including an unknown third party 202 who has not submitted an application 114 to the server 108.

The unknown third party 202 may call the alias telephone number 118. The alias telephone number 118 may be managed by a telephone network 204, such as a public switched telephone network, a cellular telephone network, or a Voice Over Internet Protocol network. The telephone network 204 may be an entity which is unrelated to the service provider 103 or the server 108. The telephone network 204 may route the telephone call to the server 108 as a direct inward dial telephone call. In addition to the voice data, the telephone call routed from the telephone network 204 to the server 108 may include the alias telephone number 118.

The server 108 may receive the telephone call from the unknown third party 202 through the telephone network 204 as a direct inward dial telephone call. The server 108 may receive the voice data and the alias telephone number 118, and may recognize a correspondence between the alias telephone number 118 and the customer telephone number 116. The server 108 may recognize the correspondence between the alias telephone number 118 and the customer telephone number 116 by, for example, consulting the database 104. The server 108 may recognize the correspondence between the alias telephone number 118 and the customer telephone number 116 without checking the origin of the telephone call from the unknown third party 202. Thus, the server 108 may recognize the correspondence between the alias telephone number 118 and the customer telephone number 116 regardless of the identity of the unknown third party 202.

The server 108 may route the telephone call from the unknown third party 202 to the customer telephone number 116, allowing the customer 112 to answer the telephone call with a telephone linked to his normal telephone. The server 108 may, for example route the telephone call to the customer telephone number 116 using Voice Over Internet Protocol and sending the telephone call over the Internet 206, according to an example embodiment. The direct inward dial telephone numbers 102 of the public switched telephone network may have been obtained by the service provider 103, and may be assigned to a gateway in the server 108. The gateway may route calls incoming from the telephone network 204 across the Internet 206 to the customer telephone number 116.

According to another example embodiment, the telephone call may be routed from the alias telephone number 118 to the customer telephone number 116 by placing a call forwarding request with the provider of the telephone network 204. However, the present disclosure is not limited to these example embodiments.

The server 108 may strip automatic number identification from the telephone call to the customer 112. Automatic number identification is a process which may enable a person receiving a telephone call to see the telephone number and/or other identifying information about the caller displayed on the receiving telephone or other electronic device. In the example embodiment in which the automatic number identification may be stripped from the telephone call to the customer 112, the customer 112 may not know the identity or telephone number of the unknown third party 202. This may give the unknown third party 202 confidence that if he or she calls the customer 112, the customer 112 may not learn the unknown third party's 202 contact information (such as telephone number), and the unknown third party 202 may choose to discontinue the relationship with the customer 112 without the customer 112 calling the unknown third party 202 back. In an example embodiment, the server 108 may display the direct inward dial telephone numbers 102 on the website 110, allowing the unknown third party 202 to check the website 110 and confirm that the alias number 202 is a direct inward dial telephone number 102 in the database 104 which will have automatic number identification stripped from the telephone call.

In another example embodiment, the server 108 may manipulate the automatic number identification upon request by the customer 112. In routing the telephone call from the alias telephone number 118 to the customer telephone number 116, the server 108 may, for example, replace the automatic number identification with the custom automatic identification number. For example, the customer 112 may choose a custom automatic call identification, such as an alphanumeric string of characters, or simply an alphabetical string of characters, to replace the automatic number identification. The customer 112 may thereby be informed that an incoming telephone call was a call to the alias telephone number 118 and has been routed by the server 108. In an example embodiment, the custom automatic call identification may have been included in the application 114, and the server 108 may have received the application 114 including the custom automatic identification number. Thus, when the customer receives a call that was originally placed to the alias number 118 and then rerouted to the customer's number 112, the custom automatic call identification may be displayed to the user instead of the phone number of the caller 202 as is displayed by typical caller ID systems. In this manner, if the customer is using the alias number 118 to receive calls from members of a dating service, the custom automatic call identification may cause, for example, "Potential Date" to be displayed to the customer 112 when the call is received.

In an example embodiment in which the customer 112 has selected a plurality of alias telephone numbers 118, each corresponding to a different geographical area, the custom automatic call identification may inform the customer 112 of the geographic location to which the unknown third party 202 believed that the telephone call was directed. Thus, if the customer is using the alias number 118 to receive calls from clients, buyers, or customers in a particular location (e.g., New York), the custom automatic call identification may cause, for example, "Potential New York Buyer" to be displayed to the customer 112 when the call is received. In another example embodiment, the customer 112 may select a plurality of telephone numbers 118, each corresponding to a different product or service that the customer 112 is selling. In this example, the custom automatic call identification may inform the customer 112 of which product or service that the unknown third party 202 is calling for.

The server 108 may allow the customer 112 to block future calls from the unknown third party 202 (i.e., from the telephone number used by the unknown third party 202 during the telephone call). For example, the customer 112 may send a signal to the server 108, such as by pressing "*77" during the telephone call, for example, and the server 108 may receive the signal from the customer 112. The server 108 may thereafter block a subsequent telephone call to the alias telephone number 118 from the unknown third party 202, based on the receiving the signal. This may be advantageous, for example, when the customer 112 uses the alias telephone number 118 to receive calls placed by members of a dating service.

In another example, the server 108 may log a time of the telephone call from the unknown third party 202 to the alias telephone number 118. The server 108 may present or display a time of the telephone call, and any other telephone calls, to the customer 112 on the website 110. The customer 112 may provide input to the server 108 via the website 110, such as an instruction to block any future calls to the alias telephone number 118 from the unknown third party 202. The server 108 may block one or any subsequent calls to the alias telephone number 118 from the unknown third party 202 based on the input from the customer 112 via the website 110. The customer 112 may thereby choose not to receive further calls from the unknown third party 202.

In an example embodiment, the above functions or processes (except for those performed by the customer 112 or the unknown third party 202) may be performed by an electronic device, such as the server 108. In this example, these functions or processes may be performed without human intervention.

Figure 3:
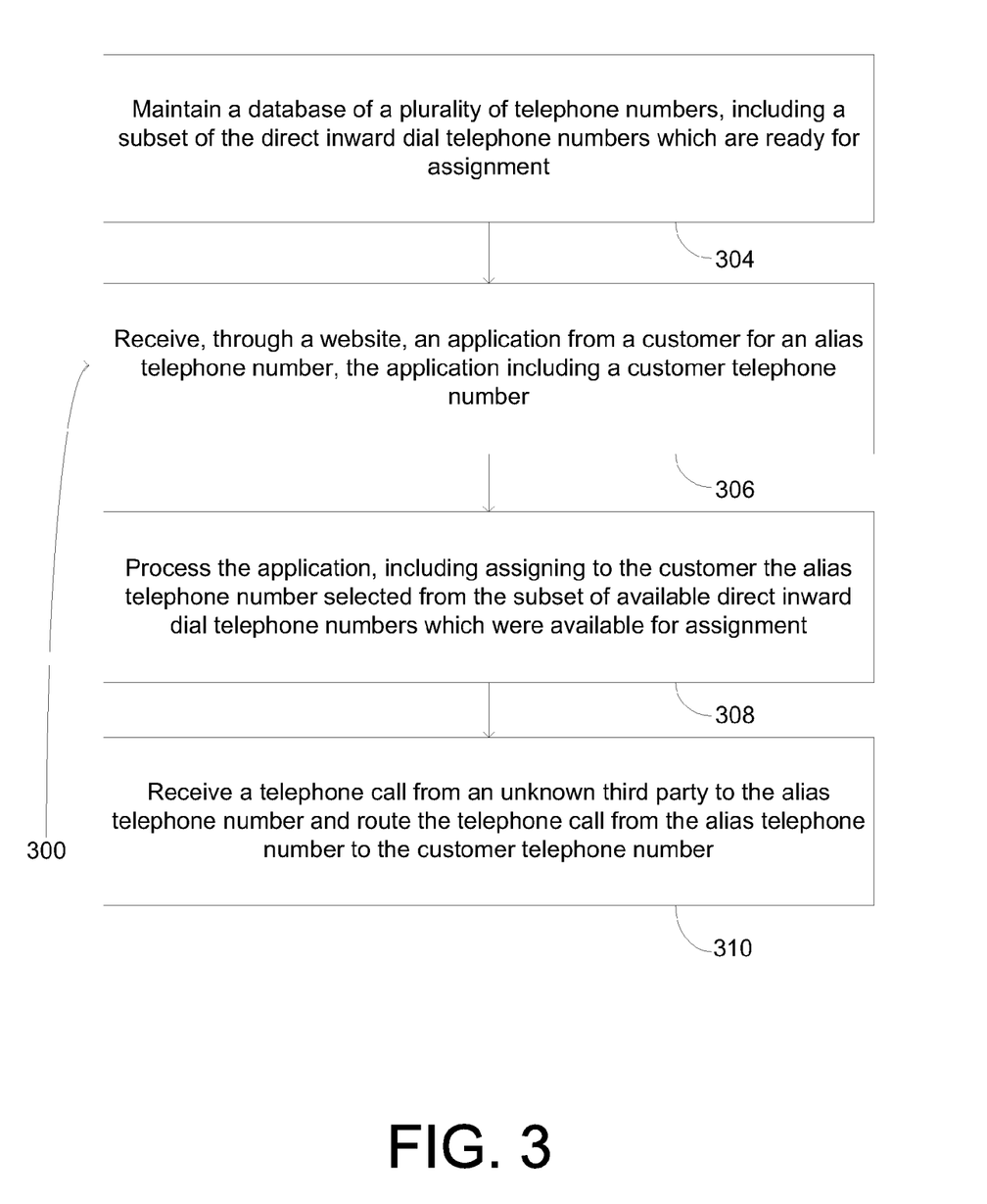
FIG. 3 is a flowchart of a method according to an example embodiment.

FIG. 3 is a flowchart showing a method 300 according to an example embodiment. A database 104 may be maintained of the plurality of direct inward dial telephone numbers 102, including a subset 106 of the direct inward dial telephone numbers 102 which are available for assignment (304). The direct inward dial telephone numbers 102 may be maintained, for example, by purchasing the direct inward dial telephone numbers 102 from the local exchange carrier 105.

This example may also include receiving an application 114 from a customer 112 for an alias telephone number 118. The application 114 may be received, for example, through a website 110. The application 114 may include a customer telephone number 116 (306). The application 114 may be processed, and the processing may include assigning the alias telephone number 118 to the customer. The alias telephone number 118 may be selected from the subset 106 of available direct inward dial telephone numbers 102 which were available for assignment (308).

The method 300 of this example may also include receiving a telephone call from an unknown third party 202 to the alias telephone number 118 and routing the telephone call from the alias telephone number 118 to the customer telephone number 116 (310). In an example embodiment, the method 300 may be performed without human intervention, such as by a server 108.

Figure 4:
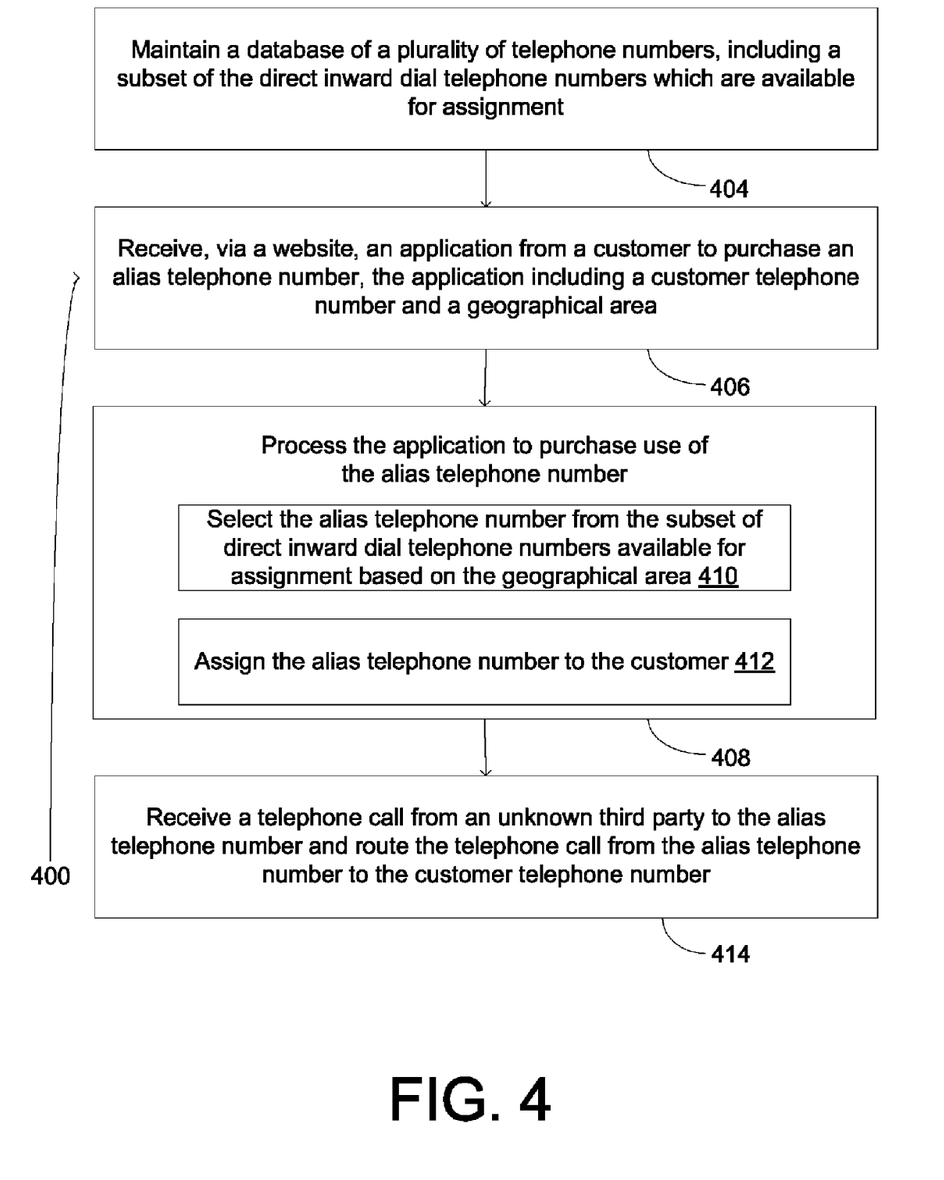
FIG. 4 is a flowchart of a method according to another example embodiment.

FIG. 4 is a flowchart showing a method 400 according to another example embodiment. A database 104 of the plurality of direct inward dial telephone numbers 102 may be maintained. The database 104 may include a subset 106 of the direct inward dial telephone numbers 102 which are available for assignment (404). The direct inward dial telephone numbers 102 may be maintained, for example, by purchasing the direct inward dial telephone numbers 102 from the local exchange carrier 105.

An application 114 to purchase use of an alias telephone number 118 may be received. The application 114 may be received via a website 110, and may include a customer telephone number 116 and a geographical area (406).

The method 400 may include processing the application 114 to purchase use of the alias telephone number 118 (408). The processing may include selecting the alias telephone number 118 from the subset 106 of direct inward dial telephone numbers 102 available for assignment based on the geographical area (410). The processing may further include assigning the alias telephone number 118 to the customer 112 (412).

The method 400 may further include receiving a telephone call from an unknown third party 202 to the alias telephone number 118 and routing the telephone call from the alias telephone number 118 to the customer telephone number 116 (414).

Implementations of the various techniques described herein may be implemented in digital electronic circuitry, or in computer hardware, firmware, software, or in combinations of them or any transmission protocol such as SIP/H323, for example, and via any wired, wireless, guided, or unguided transmission medium. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program implementing the methods described above may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program may include, by way of example, both general and special purpose microprocessors, and any one or more processors of any kind of digital computer. Generally, a processor may receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended Claims are intended to cover all such modifications and changes as fall within the true spirit of the embodiments of the present disclosure.

What is claimed is:

1. A method comprising:
   maintaining a database of a plurality of direct inward dial telephone numbers, including a subset of the direct inward dial telephone numbers which are available for assignment;
   receiving, through a website, an application from a customer for an alias telephone number to be associated with a customer telephone number, the application including a custom string of characters and requesting the custom string of characters to be associated with the alias telephone number;
   processing the application, the processing including assigning to the customer an assigned alias telephone number selected from the subset of available telephone numbers which are available for assignment and associating the assigned alias number with the customer telephone number; and
   receiving a telephone call from a third party to the assigned alias telephone number and routing the telephone call from the assigned alias telephone number to the customer telephone number, the routing including replacing an automatic number identification of the telephone call from the third party with the custom string of characters received from the customer based on the request, thereby informing the customer that the telephone call was a call to the assigned alias telephone number.

2. The method of claim 1, wherein the subset of available telephone numbers includes a subset of available direct inward dial telephone numbers.

3. The method of claim 1, wherein:
   receiving the application includes receiving payment information from the customer; and
   processing the application includes processing the payment information.

4. The method of claim 1, wherein:
   receiving the application includes receiving credit card information from the customer; and
   processing the application includes processing the credit card information.

5. The method of claim 1, wherein receiving the application and processing the application are both performed during a persistent connection between a server which maintains the website and an internet service provider of the customer.

6. The method of claim 1, wherein assigning to the customer the assigned alias telephone number includes sending an electronic message to the customer, the electronic message including the assigned alias telephone number.

7. The method of claim 1, wherein assigning to the customer the assigned alias telephone number includes displaying the assigned alias telephone number on the website.

8. The method of claim 1, wherein:
   routing the telephone call includes receiving a signal from the customer; and
   the method further includes blocking a subsequent telephone call to the assigned alias telephone number from the unknown third party based on the receiving the signal.

9. The method of claim 1 further comprising:
   logging a time of the telephone call which was received from the unknown third party;
   presenting the time of the telephone call to the customer on the website; and
   blocking a subsequent call to the assigned alias telephone number from the unknown third party based on input received from the customer via the website.

10. The method of claim 1, further including displaying the plurality of direct inward dial telephone numbers on the website.

11. The method of claim 1, wherein the method is performed without human intervention.

12. The method of claim 1, wherein:
    the application requests a first alias telephone number to be associated with the customer telephone number and a second alias telephone number to be associated with the customer telephone number, and the application includes a first custom string of characters and a second customer string of characters, the application requesting the first custom string of characters to be associated with the first alias telephone number and the second custom string of characters to be associated with the second alias telephone number;
    the processing includes assigning to the customer a first assigned alias telephone number and a second assigned alias telephone number selected from the subset of available telephone numbers which are available for assignment and associating the first and second assigned telephone numbers with the customer telephone number; and
    receiving a telephone call from the third party to the first or second assigned alias telephone number and routing the telephone call from the first or second assigned alias telephone number to the customer telephone number, the routing including replacing the automatic number identification of the telephone call from the third party with the custom string of characters associated with the assigned alias telephone number to which the telephone call was placed, based on the request, thereby informing the customer which of the first and second assigned alias telephone numbers that the telephone call was placed to.

13. The method of claim 1 wherein:
    the application includes an application to purchase the alias telephone number for a specified period of time; and
    the telephone call is received during the specified period of time.

14. A method comprising:
    maintaining a database of a plurality of telephone numbers, including a subset of the direct inward dial telephone numbers which are available for assignment;
    receiving, via a website, an application from a customer to purchase use of an alias telephone number, the application including a customer telephone number, a geographical area, a custom string of characters to be associated with the alias number, and a request for the custom string of characters to be associated with the alias number;

processing the application to purchase use of the alias telephone number, the processing including:
  selecting an assigned alias telephone number from the subset of direct inward dial telephone numbers available for assignment based on the geographical area; and
  assigning the alias telephone number to the customer and associating the alias number with the customer telephone number; and
receiving a telephone call from a third party to the assigned alias telephone number and routing the telephone call from the assigned alias telephone number to the customer telephone number, the routing including replacing an automatic number identification of the telephone call from the third party with the custom string of characters received from the customer based on the request, thereby informing the customer that the telephone call was a call to the assigned alias telephone number.

15. The method of claim 14, wherein the subset of telephone numbers includes a subset of direct inward dial telephone numbers.

16. The method of claim 14, wherein receiving the application and processing the application are both performed during a single session in which the customer is logged onto the website.

17. The method of claim 14, wherein receiving the application and processing the application are both performed during a persistent connection between a server which maintains the website and an internet service provider of the customer.

18. The method of claim 14, wherein:
  receiving the application includes receiving payment information from the customer; and
  processing the application includes simultaneously confirming availability of the assigned alias telephone number corresponding to the geographical area and confirming the payment information with a third party vendor.

19. The method of claim 14, wherein the method is performed without human intervention.

20. An apparatus configured to:
  maintain a database of the plurality of telephone numbers, including a subset of the direct inward dial telephone numbers which are available for assignment;
  receive, through a website, an application from a customer for an alias telephone number, the application including a customer telephone number, a custom string of characters, and a request for the custom string of characters to be associated with the alias telephone number;
  process the application, the processing including assigning to the customer an assigned alias telephone number selected from the subset of available telephone numbers which were ready for assignment; and
  receive a telephone call from an unknown third party to the alias telephone number during the specified period of time and route the telephone call from the alias telephone number to the customer telephone number, the routing including replacing an automatic number identification of the telephone call from the third party with the custom string of characters received from the customer based on the request, thereby informing the customer that the telephone call was a call to the assigned alias telephone number.

21. The apparatus of claim 20, wherein the plurality of telephone numbers includes a plurality of direct inward dial telephone numbers.

22. A method comprising:
  maintaining a database of a plurality of telephone numbers, including a subset of the direct inward dial telephone numbers which are available for assignment;
  receiving an application from a customer for an alias telephone number to be associated with a customer telephone number, the application including a custom string of characters and requesting the custom string of characters to be associated with the alias telephone number;
  processing the application, the processing including assigning to the customer an assigned alias telephone number selected from the subset of available direct inward dial telephone numbers which are available for assignment and associating the assigned alias number with the customer telephone number; and
  receiving a telephone call from a third party to the alias telephone number through a public switched telephone network and routing the telephone call from the alias telephone number to the customer telephone number, the routing including replacing an automatic number identification of the telephone call from the third party with the custom string of characters received from the customer based on the request, thereby informing the customer that the telephone call was a call to the assigned alias telephone number.

23. The method of claim 22, wherein the plurality of telephone numbers includes a plurality of direct inward dial telephone numbers.

* * * * *